US007949861B2

(12) United States Patent     (10) Patent No.:    US 7,949,861 B2
McIlvaine et al.                                   (45) Date of Patent:      May 24, 2011

(54) METHOD AND APPARATUS FOR MANAGING INSTRUCTION FLUSHING IN A MICROPROCESSOR'S INSTRUCTION PIPELINE

(75) Inventors: Michael Scott McIlvaine, Raleigh, NC (US); James Norris Dieffenderfer, Apex, NC (US); Thomas Andrew Sartorius, Raleigh, NC (US)

(73) Assignee: QUALCOMM Incorporated, San Diego, CA (US)

(*) Notice: Subject to any disclaimer, the term of this patent is extended or adjusted under 35 U.S.C. 154(b) by 462 days.

(21) Appl. No.: 11/149,773

(22) Filed: Jun. 10, 2005

(65) Prior Publication Data

US 2006/0282829 A1     Dec. 14, 2006

(51) Int. Cl.
*G06F 7/38*          (2006.01)
*G06F 9/00*          (2006.01)
*G06F 9/44*          (2006.01)
*G06F 15/00*        (2006.01)

(52) U.S. Cl. .................................................. 712/239
(58) Field of Classification Search .................. 712/239
See application file for complete search history.

(56) References Cited

U.S. PATENT DOCUMENTS

| | | | | |
|---|---|---|---|---|
| 5,561,776 A | * | 10/1996 | Popescu et al. | 712/239 |
| 5,634,103 A | | 5/1997 | Dietz et al. | |
| 5,764,970 A | * | 6/1998 | Rana et al. | 712/233 |
| 5,809,324 A | * | 9/1998 | Yung | 712/23 |
| 5,961,636 A | * | 10/1999 | Brooks et al. | 712/228 |
| 6,026,477 A | * | 2/2000 | Kyker et al. | 712/2 |
| 6,289,442 B1 | * | 9/2001 | Asato | 712/239 |
| 6,772,323 B2 | | 8/2004 | Krishnan et al. | |
| 6,799,263 B1 | * | 9/2004 | Morris et al. | 712/207 |
| 6,883,090 B2 | * | 4/2005 | Kruckemyer | 712/233 |
| 2005/0071614 A1 | * | 3/2005 | Jourdan et al. | 712/239 |

FOREIGN PATENT DOCUMENTS

KR     1020070105366      10/2007

OTHER PUBLICATIONS

Smith; A Study of Branch Prediction Strategies; 1981; IEEE.*
International Search Report and Written Opinion—PCT/US2006/21617, International Search Authority—European Patent Office—Feb. 27, 2007.
Supplementary European Search Report—EP06784570, Search Authority—Munich Patent Office, Jun. 13, 2008.

* cited by examiner

*Primary Examiner* — Eddie P Chan
*Assistant Examiner* — Corey Faherty
(74) *Attorney, Agent, or Firm* — Peter M. Kamarchik; Nicholas J. Pauley; Jonathan T. Velasco

(57) ABSTRACT

In one or more embodiments, a processor includes one or more circuits to flush instructions from an instruction pipeline on a selective basis responsive to detecting a branch misprediction, such that those instructions marked as being dependent on the branch instruction associated with the branch misprediction are flushed. Thus, the one or more circuits may be configured to mark instructions fetched into the processor's instruction pipeline(s) to indicate their branch prediction dependencies, directly or indirectly detect incorrect branch predictions, and directly or indirectly flush instructions in the instruction pipeline(s) that are marked as being dependent on an incorrect branch prediction.

23 Claims, 4 Drawing Sheets

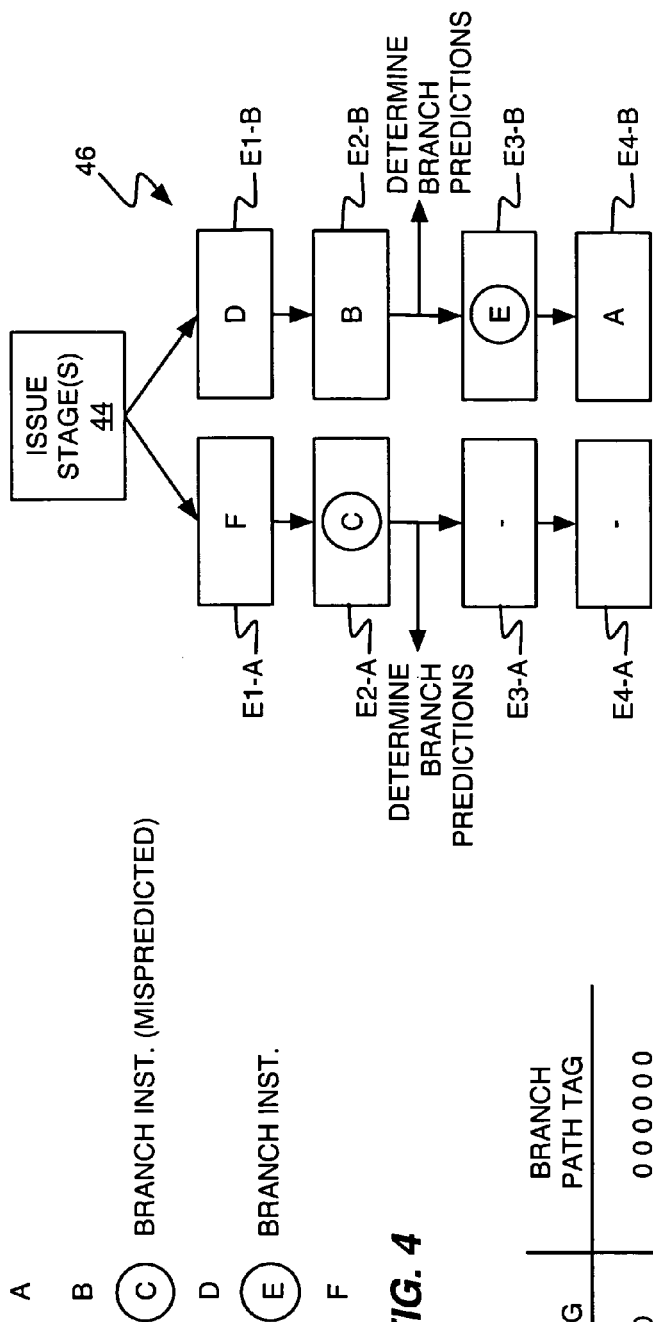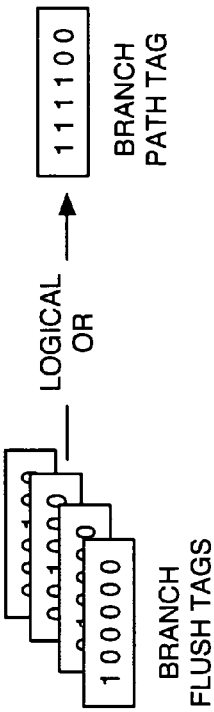

METHOD AND APPARATUS FOR MANAGING INSTRUCTION FLUSHING IN A MICROPROCESSOR'S INSTRUCTION PIPELINE

BACKGROUND

1. Field of the Invention

The present invention generally relates to microprocessors, and particularly relates to managing instruction flushing in a microprocessor's instruction pipeline.

2. Relevant Background

Microprocessors find use in a wide variety of products, ranging from high-end computational systems, where processing power represents a paramount design consideration, to low-end embedded systems, where cost, size, and power consumption comprise the primary design considerations. Processors targeted for battery-powered portable devices, such as music players, palmtop computers, Portable Digital Assistants (PDAs), and the like, represent a particularly complex mix of competing design considerations. On the one hand, processor performance must be sufficient to support the device's intended functionality and provide a satisfactory user "experience." On the other hand, low processor power consumption helps to permit the use of reasonably sized battery systems, while achieving acceptable battery life.

The above mix of design tradeoffs has resulted in numerous processor performance and efficiency advancements. For example, modern pipelined processors, such as those based on a Reduced Instruction Set Computer (RISC) architecture, oftentimes employ branch prediction methods to prevent instruction pipeline "stalls." With an instruction pipeline, different aspects of sequential instruction processing generally occur in different stages of the pipeline. For example, a given instruction pipeline may include successively arranged fetch, decode, issue, and execute stages. Each stage generally operates on a different instruction, or instructions, at each instruction clock cycle. For example, as the execution of one instruction is being completed in the execute stage, other instructions are being fetched, decoded, issued, etc. Staged execution allows the pipelined processor on average to execute one instruction per clock cycle.

However, maintaining that one-instruction-per-clock cycle average depends on keeping the pipeline full of instructions. In turn, keeping the pipeline full of instructions means that the pipelined processor generally cannot afford to stop program instruction fetching while determining whether a given program branch will or will not be taken. That is, the processor generally must make a guess (a prediction) about whether a given program branch will be taken or not taken. If the prediction is "taken," then instruction fetching continues from the branch target address. If the prediction is not taken, then instruction fetching continues from the next instruction address after the branch instruction.

In either case, the instructions fetched into the pipeline subsequent to such a prediction will be the "wrong" instructions if that prediction was incorrect. The pipeline may have multiple predictions outstanding at any given time, i.e., it may have multiple undetermined branch instructions in-flight within various ones of its pipeline stages. Thus, any given one of the instructions in-flight within the pipeline may depend on one or more of the outstanding branch predictions, or may not depend on any of them.

Such possibilities introduce a processing complexity in the context of branch mispredictions. Generally, at least some of the in-flight instructions will be dependent on at least one of the outstanding branch predictions, and therefore should be flushed from the instruction pipeline responsive to detecting a corresponding branch misprediction. The challenge arises from the difficulty in accurately identifying or tracking the branch prediction dependencies of the in-flight instructions, particularly because some instructions may be executed out of the original program order.

For example, a given instruction may have to wait on data because of a cache miss and, rather than stalling the pipeline while the data is retrieved from external memory, execution of that instruction may be suspended while the pipeline continues processing other in-flight instructions. More generally, executing instructions out of program order represents one of the processing performance advantages of superscalar instruction pipelines comprising parallel sets of pipeline stages. Such superscalar pipelines may have large numbers of in-flight instructions, with many of them executing out of program order.

Thus, selectively flushing only the instructions dependent on a particular branch misprediction represents a potentially significant challenge in terms of being able to accurately identify such dependencies without introducing too much tracking complexity. Of course, the alternative to selectively flushing instructions is flushing all instructions from the pipeline when a branch misprediction is detected, without regard to whether individual ones of those instructions actually depend on the mispredicted branch instruction. The downside of that approach is the performance and efficiency loss associated with flushing valid instructions from the pipeline that have already been fetched and at least partially processed.

SUMMARY OF THE DISCLOSURE

The present invention comprises a method and apparatus for managing instruction flushing in the instruction pipeline of a microprocessor. In at least one embodiment, one or more circuits included in the microprocessor are configured to manage instruction flushing based on marking instructions fetched into the instruction pipeline to indicate their branch prediction dependencies, detecting incorrect branch predictions, and flushing instructions in the instruction pipeline that are marked as being dependent on an incorrect branch prediction.

Marking instructions fetched into the instruction pipeline to indicate their branch prediction dependencies comprises, in at least one embodiment, activating bit indicators responsive to making branch predictions, leaving the corresponding bit indicator active for a particular branch prediction until that branch prediction is resolved, and marking each instruction fetched into the instruction pipeline with an aggregation of the active bit indicators. For example, flushing instructions in the instruction pipeline that are marked as being dependent on an incorrect branch prediction may comprise broadcasting a flush signal based on the bit indicator corresponding to the incorrect branch prediction, and flushing instructions in the instruction pipeline that are marked with that bit indicator. Similarly, a clear signal may be broadcast based on the bit indicator corresponding to a correct branch prediction to clear the corresponding bit indicator from the instructions in the instruction pipeline that were marked as being dependent on that branch prediction. Clearing allows bit indicators to be re-used in the dependency marking process.

In one or more embodiments, marking instructions fetched into the instruction pipeline to indicate their branch prediction dependencies comprises assigning a "branch flush tag" at least to each conditional branch instruction fetched into the instruction pipeline, and appending a "branch path tag" based on the previously assigned branch flush tags to each instruction fetched into the instruction pipeline. In the context of this embodiment, flushing instructions in the instruction pipeline that are marked as being dependent on an incorrect branch prediction may be based on resolving branch conditions in an execution stage of the instruction pipeline to detect correct and incorrect branch predictions, and, for an incorrect branch prediction, broadcasting a flush signal in the instruction pipeline based on the branch flush tag of the associated conditional branch instruction. Instructions in the instruction pipeline whose branch path tags are marked with the branch flush tag of the associated conditional branch instruction may be flushed responsive to the broadcast.

Accordingly, one or more processor embodiments include a flush control circuit configured to mark instructions fetched into the instruction pipeline to indicate their branch prediction dependencies, detect incorrect branch predictions, and flush instructions in the instruction pipeline that are marked as being dependent on an incorrect branch prediction. The flush control circuit may, in carrying out these operations, generate and maintain branch flush tags and branch path tags, and may include circuitry for cooperating with one or more of the instruction pipeline stages, to carry out the clearing and flushing operations described above, or to carry out variations of those operations.

BRIEF DESCRIPTION OF THE DRAWINGS

FIG. 4 is a program instruction flow diagram illustrating six instructions fetched into an instruction pipeline in program flow order.

FIG. 5 is a block diagram of a superscalar instruction pipeline supporting out-of-order instruction execution.

FIG. 6 is a table illustrating the generation and appending of branch flush tags specifically to branch instructions fetched into an instruction pipeline and appending branch path tags generally to all types of instructions fetched into the instruction pipeline.

FIG. 7 is a block diagram of a representative set of branch flush tags corresponding to a given number of outstanding branch predictions, and a corresponding branch path tag that logically aggregates the individual branch flush tags.

DESCRIPTION OF EMBODIMENTS OF THE INVENTION

Figure 1:
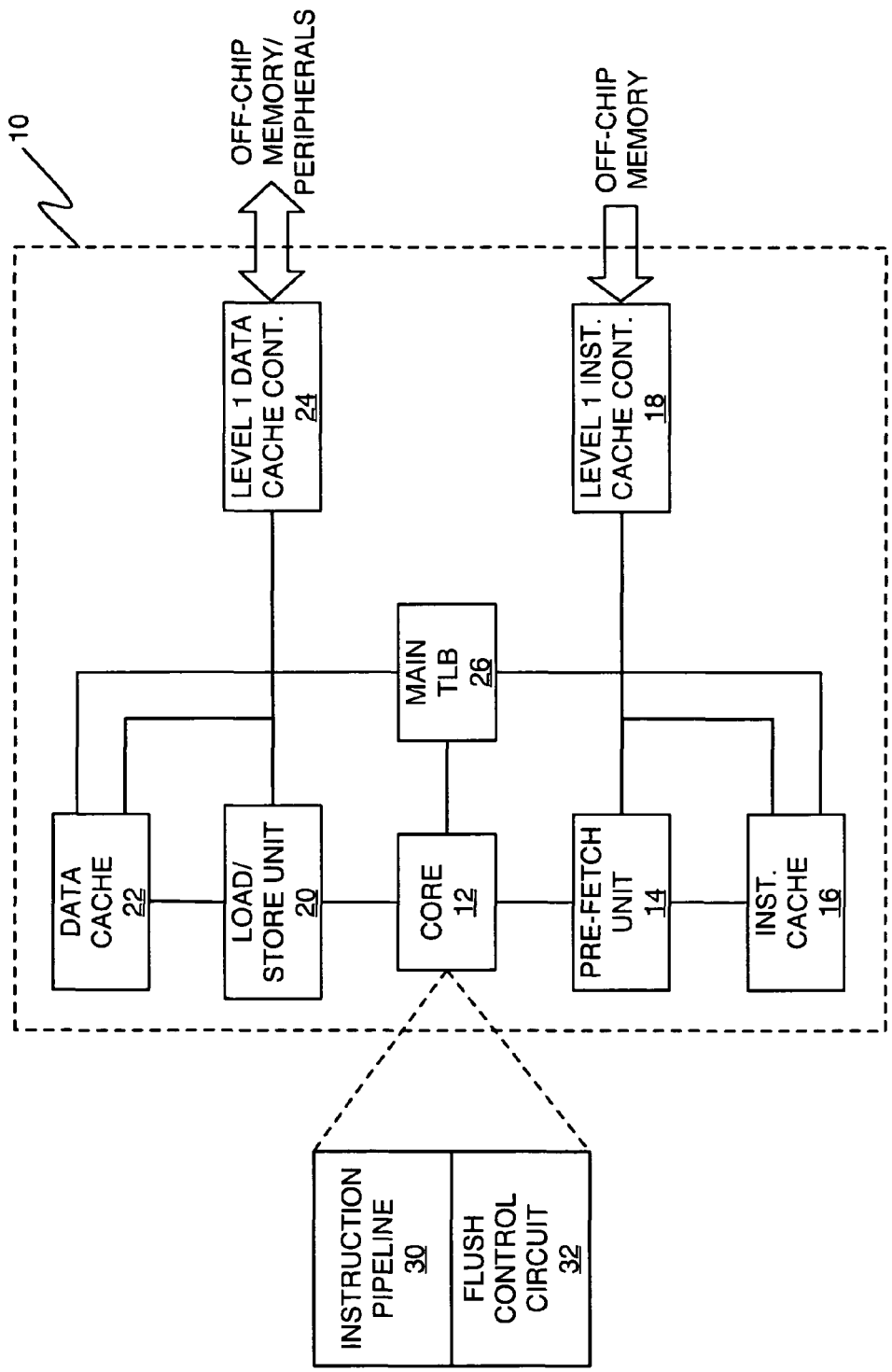
FIG. 1 is a block diagram illustrating a microprocessor, including an instruction pipeline and an associated flush control circuit.

FIG. 1 at least partially illustrates a microprocessor 10 comprising a processor core 12, an instruction pre-fetch unit 14, an instruction cache 16, an instruction cache controller 18, a load/store unit 20, a data cache 22, a data cache controller 24, and a main translation lookaside buffer 26. In one or more embodiments of the processor 10, an instruction pipeline 30 of the processor core 12 includes, or is associated with, a flush control circuit 32. The flush control circuit 32 supports flushing in-flight instructions from the instruction pipeline 30, as part of managing branch instruction target address predictions.

By way of non-limiting example, the processor 10 may be a pipelined processor based on a Reduced Instruction Set Computer (RISC) architecture. In at least one embodiment of the processor 10, the instruction pipeline 30 supports out-of-order program execution, and may comprise a superscalar instruction pipeline that includes a plurality of parallel execution stages (not shown).

Whether or not the processor 10 incorporates superscalar features, the core 12 executes program instructions and carries out corresponding load/store data operations. The translation lookaside buffer 26 accepts inputs from the core 12 and provides outputs to the core 12. More particularly, the translation lookaside buffer 26 interfaces the core 12 to the instruction and data caches 16 and 22, respectively. The instruction and data caches 16 and 22 comprise fast, on-board memory, and the processor 10 uses instruction and data pre-fetching via the instruction and data cache controllers 18 and 24 to keep the caches filled with the next-needed instructions and data.

In one aspect of instruction pre-fetching, the processor 10 uses branch prediction to accelerate its overall performance. With branch prediction, the processor 10 generally does not interrupt the core's instruction fetching operations when conditional branch instructions are recognized in the program flow, but rather continues instruction fetching from the next sequential instruction addresses or from the branch target addresses, in dependence on predicting the program branches as taken or not taken. By way of non-limiting example, the core 12 may be configured to perform "static" branch prediction, and the pre-fetch unit 14 may be configured to perform dynamic branch prediction, based on accumulating branch prediction statistics, etc. Other circuit configurations may be used to support such operations, and those skilled in the art will recognize that the general point to keep in mind is that the processor 10 is a branch-predicting processor, wherein at least some of the instructions fetched into the instruction pipeline 30 depend on the branch predictions being made by the processor 10 during program execution.

Generally, for a predicted taken program branch, instruction fetching continues from the instruction address targeted by the branch instruction, and for a predicted not taken branch, instruction fetching continues from the instruction address following the branch instruction in the instruction sequence. Thus, to the extent that some branches are incorrectly predicted as taken or not taken, the "wrong" program instructions will be fetched into the processor's instruction pipeline 30.

Figure 2:
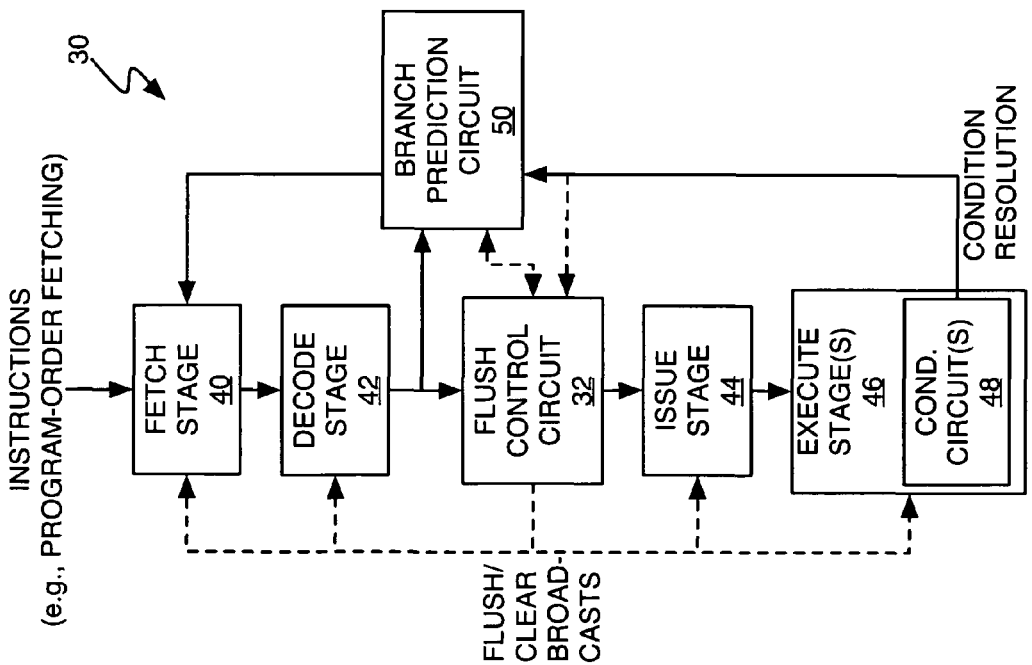
FIG. 2 is a block diagram of one embodiment of an instruction pipeline and its associated flush control circuit.

With that point in mind, the flush control circuit 32 is configured to flush, directly or indirectly, those instructions already in the pipeline 30 that are "marked" as being dependent on an incorrect branch prediction. Such flushing operations are better described in the context of the instruction pipeline 30, and FIG. 2 illustrates one embodiment of the instruction pipeline 30 and the flush control circuit 32. The illustrated instruction pipeline 30 comprises a fetch stage 40, an instruction decode stage 42, an instruction issue stage 44, and an instruction execute stage 46. The execute stage 46 includes, or is associated with, a condition determination circuit 48 that evaluates the conditions associated with conditional branch instructions. In other words, the condition determination circuit 48 "resolves" undetermined branch instructions, by determining their branch conditions. Determination of the branch conditions associated with conditional branch instructions enables determination of whether the branch predictions made for those branch instructions were correct or incorrect.

For example, a branch prediction circuit 50 that is associated with the instruction pipeline 30 may be configured to recognize branch instructions after they are decoded by the instruction decode stage 42, and to make predictions as to whether those branches will or will not be taken. Such predictions are made before resolving the branch conditions, and the correctness of the prediction made for a given branch instruction is not known until that branch instruction's condition is evaluated by the condition evaluation circuit 48, which can be configured to provide an output indicating the condition resolution of each conditional branch instruction executed by the execute stage 46. Thus, the branch prediction circuit 50 and/or the flush control circuit 32 can be configured to receive the condition evaluation results output by the condition evaluation circuit 48, to determine whether a given branch instruction was correctly predicted as taken or not taken.

If a branch instruction was incorrectly predicted as taken, or incorrectly predicted as not taken, the flush control circuit 32 operates to flush those instructions that are in-flight within the instruction pipeline 30 that are dependent on the mispredicted branch. More particularly, in at least one embodiment, the flush control circuit 32 is operative to "mark" the branch prediction dependencies of instructions fetched into the instruction pipeline 30, and, responsive to detecting a branch misprediction, cause those instructions currently in the instruction pipeline 30 that are marked as being dependent on that particular branch misprediction to be flushed. In at least one embodiment, NOP (no operation) instructions are used to fill any "bubbles" created in the instruction pipeline 30 by the flushing operation, but other embodiments may not insert NOPs, or may take other steps, as needed, to continue operations in the instruction pipeline 30 after flushing. As part of flushing, or subsequent to flushing, the instruction pipeline 30 may be refilled by fetching instructions from the appropriate address.

Figure 3:
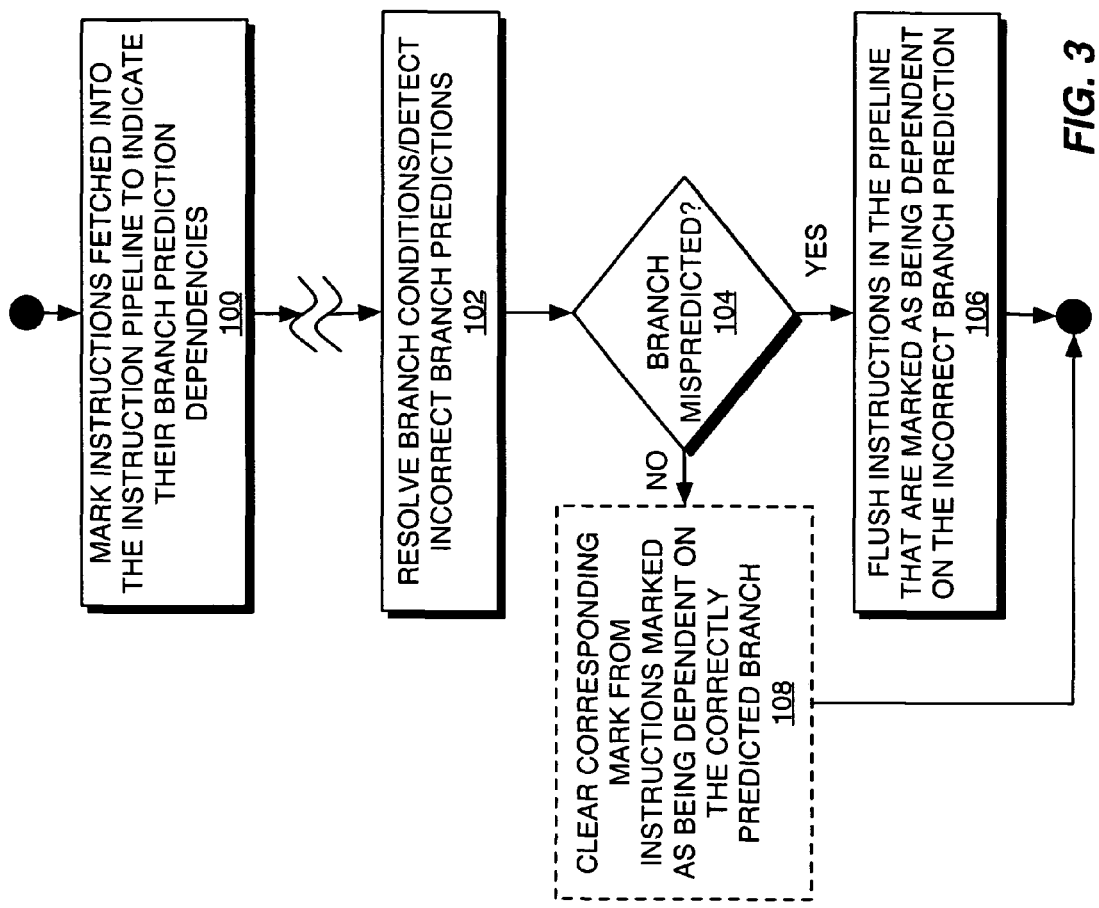
FIG. 3 is a logic flow diagram of processing logic supporting one embodiment of flushing instructions from an instruction pipeline based on marking and tracking branch prediction dependencies.

FIG. 3 illustrates processing logic for instruction flushing that may be implemented in the flush control circuit 32, or in support of that circuit's operations. The illustrated logic assumes that instruction fetching is ongoing, and that the flush control circuit 32 marks the instructions fetched into the instruction pipeline 30 to indicate their branch prediction dependencies (Step 100). It should be understood that, generally, a given instruction fetched into the pipeline depends directly, or indirectly, on the unresolved branch predictions that are currently outstanding in the instruction pipeline 30. Thus, the branch prediction dependencies change during program execution, as new predictions are made and old predictions are resolved, and the branch prediction dependency marking operations of the flush control circuit 32 change accordingly.

Assuming that marked instructions are flowing through the instruction pipeline's various stages, and that branch conditions are being resolved at some point in the instruction pipeline 30 (Step 102), the flush control circuit 32 directly (or indirectly) detects branch mispredictions (Step 104), and responds accordingly. Specifically, in at least one embodiment of the flush control circuit 32, it flushes all instructions currently in the instruction pipeline 30 that are marked as being dependent on the incorrect branch prediction (Step 106).

It should be understood that, in one or more embodiments, one mechanism for accomplishing that flushing involves the flush control circuit 32 "broadcasting" a flush signal that is used by corresponding circuitry in one or more of the stages in the instruction pipeline 30 to carry out the actual flushing. Similarly, for a correctly predicted branch, the flush control circuit 32 may broadcast a clear signal that is used in one or more of the stages of the instruction pipeline 30 to clear the corresponding dependency marking from any instruction marked as being dependent on that branch (Step 108). In at least one embodiment, clearing operations are optional. However, providing a clearing mechanism offers several benefits, including allowing the re-use of the same dependency marks for later-fetched instructions.

Regardless of those indicator re-use aspects of the flush control circuit 32, FIG. 4 facilitates a better understanding of the more fundamental aspects of branch prediction dependency marking, by illustrating six instructions in program flow order, denoted as "A," "B," "C," "D," "E," and "F." It is assumed that these instructions are fetched into the instruction pipeline 30 in program order, and that the circled instructions C and E are conditional branch instructions for which the corresponding branch address targets were predicted as taken or not taken. Thus, the instructions D and E are fetched from locations dependent on the taken/not-taken prediction made for the branch instruction C. Likewise, the instruction F is fetched from a location directly dependent on the taken/not-taken prediction made for the branch instruction E, and directly or indirectly dependent on the prior prediction made for the instruction C. Put simply, the instructions D, E, and F, depend on the branch prediction made for the branch instruction C, and the instruction F additionally depends on the branch prediction made for the branch instruction E.

FIG. 5 illustrates the instructions A-F being executed out of program order in a superscalar embodiment of the instruction pipeline 30. More particularly, the illustrated execute stage 46 comprises two parallel sets of execute stages, labeled as stages E1-A through E4-A for the first set, and labeled as E1-B through E4-B for the second set. Of course, it should be understood that the instruction pipeline 30 in actuality may use an even more complex execute stage arrangement, may use a different stage arrangement, or may use stages and other elements not generally illustrated herein.

In any case, one may readily appreciate that, absent the dependency marking taught herein, the task of identifying the instructions in the instruction pipeline 30 that must be flushed because of a branch misprediction can become quite complicated. Of course, one simply might flush the entire instruction pipeline 30 upon detecting any branch misprediction, but that would forfeit the performance and efficiency benefits gained by retaining non-dependent instructions that already are in-flight within the instruction pipeline 30.

The flush control circuit 30 preserves those benefits, while ensuring that dependent instructions are flushed. In at least one embodiment of the flush control circuit 32, it marks instructions fetched into the instruction pipeline 30 to indicate their branch prediction dependencies by activating bit indicators responsive to making branch predictions, leaving the corresponding bit indicator active for a particular branch prediction until that branch prediction is resolved, and marking each instruction fetched into the instruction pipeline 30 with an aggregation of the active bit indicators. Such marking may occur at any convenient point in the instruction pipeline 30, such as the fetch stage 40, the decode stage 42, or in the flush control circuit 32, if it is disposed in the instruction flow path, or if it has access to that path.

In at least one embodiment, flushing instructions in the instruction pipeline 30 that are marked as being dependent on an incorrect branch prediction comprises broadcasting a flush signal and flushing instructions in the instruction pipeline 30 that are marked with that bit indicator. The flush signal may be a vector based on the bit indicator corresponding to the branch flush tag of the incorrectly predicted branch instruction. Similarly, for branch predictions that are detected as being correctly predicted, the flush control circuit 32 can be configured to broadcast a clear signal based on the bit indicator corresponding to a correct branch prediction, to thereby clear the corresponding bit indicator from the instructions in the instruction pipeline 30 that were marked as being dependent on that branch prediction. The clear signal may be a vector that is the inverse of the branch's branch flush tag, such that it can be logically ANDed with each instruction's branch path tag to clear the appropriate bit in the branch path tag. Note that the clearing of dependency indicators for correctly predicted branches allows those indicator positions to be reused.

One embodiment of the above marking method is illustrated in FIGS. 6 and 7 for the set of instructions previously illustrated in FIG. 4. Branch instructions, at least those for which branch predictions are made, are assigned a corresponding "branch flush tag." The branch flush tag can be appended as a bit vector to the actual branch instruction, so that it is carried with the branch instruction down through the instruction pipeline 30. Further, each instruction fetched into the instruction pipeline is marked to indicate its branch prediction dependencies by appending a "branch path tag" to it. A branch path tag can be formed as a logical aggregation of the currently outstanding branch flush tags.

Thus, if the branch flush tags are implemented as a set of unique one-hot vectors—i.e., each branch flush tag has a different bit position set—then a branch path tag can be formed and appended to each instruction by logically OR-ing the currently active branch flush tags. One example of that type of logical OR-ing is illustrated in FIG. 6.

The instructions A and B are assigned branch flush tags of zero (or are not assigned any branch flush tag at all), since they are not branch instructions, and are assigned branch path tags of all-zeros, assuming that no branch predictions were outstanding when they were fetched into the instruction pipeline. The instruction C is a branch instruction, and it is assigned a branch flush tag having a unique one-hot vector bit position; however, its branch path tag is set to all-zeros, since there were no branch predictions outstanding when it was fetched.

Because the instruction D itself is not a branch instruction, it is not assigned a branch flush tag. Alternatively, it may be assigned an all-zero branch flush tag. In either case, the branch path tag appended to the instruction D has a bit set in the position corresponding to the marker bit in the branch flush tag of the instruction C. Thus, the instruction D is marked as being dependent on the branch prediction made for the branch instruction C. Similarly, the instructions E and F are marked with branch path tags indicating their dependency on the branch prediction made for the branch instruction C. Further, the branch path tag appended to the instruction F additionally is marked to show its dependency on the branch prediction made for the branch instruction E.

With the above method, each conditional branch instruction generally is assigned a unique branch flush tag, not reusing the tag(s) currently claimed by any unresolved branch instructions still in the pipeline. Once a conditional branch is resolved in the pipeline, or flushed from the pipeline, its branch flush tag may be "retired," in which case it can be reused. That is, previously assigned branch flush tags can be retired and marked for reuse when the branches to which they were assigned are resolved, or when they are flushed from the pipeline because they are dependent on another instruction (branch) that is flushed, or because of an interrupt-related flush, for example.

In at least one embodiment, the widths of the branch flush tags and branch path tags are equal, with the width being determined by the number of outstanding branches that are allowed to be in the processor's pipeline between the stage where the tags are assigned and the stage where the branch conditions are resolved, assuming that the instructions are kept in order until the tags are assigned. The appropriate tag width would be, at a maximum, equal to the number of stages between the two specified points in the processor's pipeline. However, in at least one embodiment, the tag width is less than the stage count, since it is unlikely that all such stages will contain conditional branches. Of course, the tag width—i.e., the number of conditional branch markers—needed may be greater if out-of-order instructions are permitted in the pipeline stages of interest and, more generally, can be determined according to the particulars of the involved processor pipeline.

Figure 8:
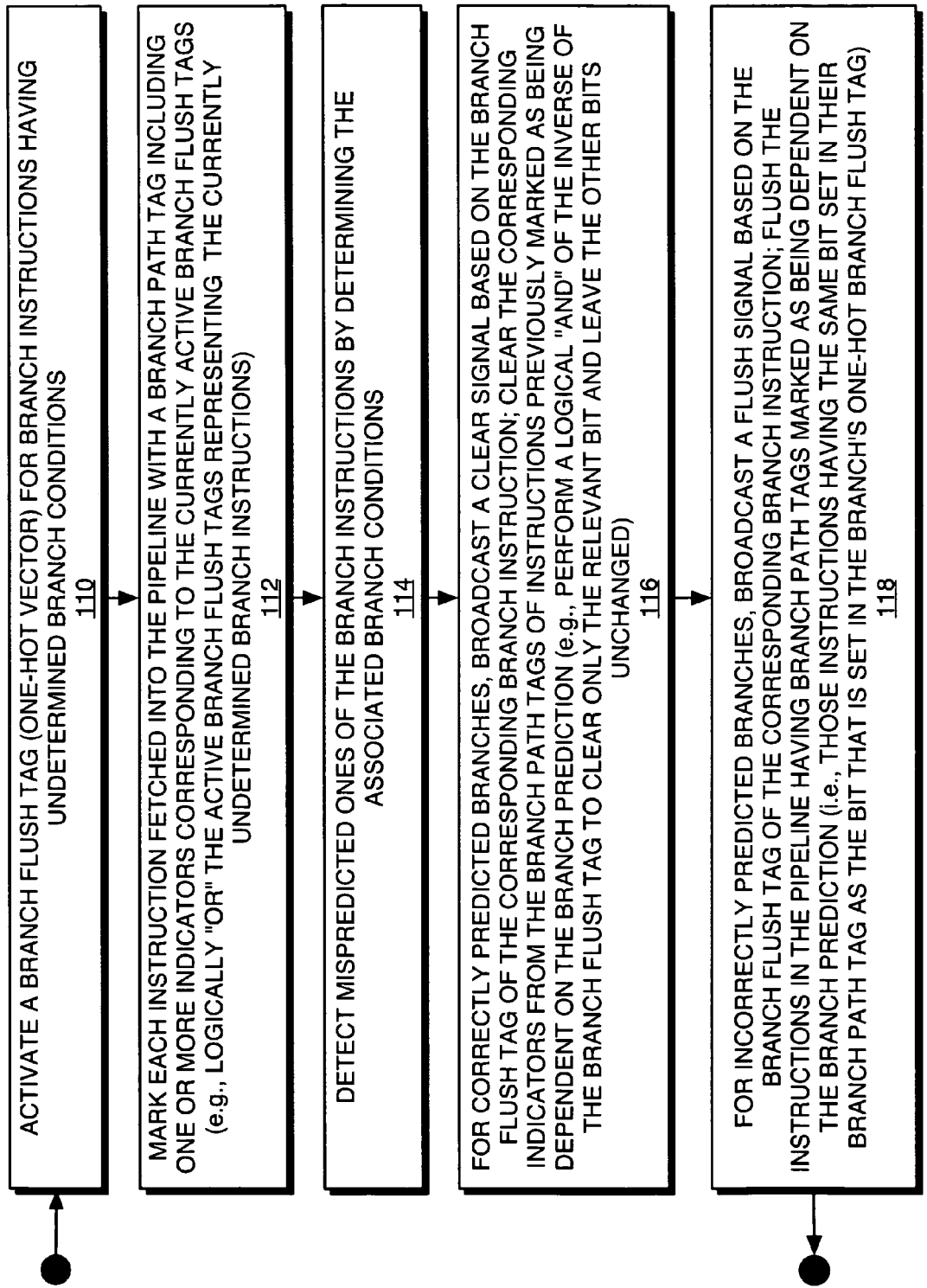
FIG. 8 is a logic flow diagram illustrating one embodiment of generating branch flush tags, marking instructions with corresponding branch path tags, and flushing or clearing instructions in an instruction pipeline, based on broadcasting flush or clear signals.

In any case, FIG. 8 steps through an example of processing details for the above embodiment of branch prediction dependency marking, wherein the flush control circuit 32 activates a branch flush tag, at least for conditional branch instructions having undetermined branch conditions (Step 110). Such activation can be done at various points in the instruction pipeline 30. For example the marking can be done as part of instruction decoding by the decode stage 42, or can be done immediately after that stage.

Regardless, branch flush tags are appended to the conditional branch instructions, so that the branch condition results output by the execute stage 46 can be identified for individual ones of the branch instructions for which predictions were made. Note that the processor 10 may simplify branch flush tag processing by appending branch flush tags to all branch instructions, whether conditional or not.

In conjunction with the above branch flush tag processing, which is specific to branch instructions, generally all instructions fetched into the instruction pipeline 30 are marked with a branch path tag including one or more indicators corresponding to the currently active branch flush tags (e.g., the logical OR of the active branch flush tags) (Step 112). The branch path tags can be appended by circuitry within the flush control circuit 32, or by circuitry located elsewhere in the instruction pipeline 30. For example, dependency marking may be implemented by circuitry in the fetch stage 40, or in the decode stage 42.

Because of the branch flush tags appended to branch instructions, the condition evaluation circuit 48 can be configured to output branch condition evaluation results that are "tagged" to a corresponding branch flush tag. That is, the conditional evaluation circuit 48 can be configured to identify the branch flush tag associated with a given condition result, and can be configured to signal that information to the flush control circuit 32 and/or to the branch prediction circuit 50, for the detection of correctly and incorrectly predicted branches (Step 114).

For a correctly predicted branch, the flush control circuit 32 can be configured to broadcast a clear signal based on the branch flush tag of the corresponding branch instruction (Step 116). The clear signal may be received at one or more of the stages comprising the instruction pipeline 30, and flush circuitry associated with those stages clears the corresponding indicator(s) from the branch path tags of the instructions in those stages that previously were marked as being dependent on the now-resolved branch prediction. Such circuitry may be configured simply to identify those instructions having appended branch path tags with set bits corresponding to the branch flush tag indicated by the clear signal. In some embodiments, such circuitry may be considered to be part of each individual stage and, in other embodiments, it may be considered to be part of the flush control circuit 32.

For an incorrectly predicted branch, the flush control circuit 32 can be configured to broadcast a flush signal based on the branch flush tag of the corresponding branch instruction (Step 118). The flush signal may be received at one or more of the stages comprising the instruction pipeline 30, and flush circuitry associated with those stages flushes the instructions having branch path tags marked as being dependent on the now-resolved branch prediction.

Those skilled in the art will recognize that the above processing logic simply represents one embodiment of a broader method for marking the branch prediction dependencies of in-flight instructions, so that such instructions can be selectively flushed from the instruction pipeline 30 responsive to detecting that a particular branch instruction was mispredicted. In general, the processor 10 is configured to mark instructions to indicate the particular branch instructions on which they depend, detect the misprediction of individual branch instructions, and selectively flush instructions from the instruction pipeline 30 by using those markings to identify the instructions that depend on the mispredicted branch.

As such, the present invention is not limited by the foregoing discussion, nor is it limited by the accompanying drawings. Rather, the present invention is limited only by the following claims and their legal equivalents.

What is claimed is:

1. A method of managing branch predictions in an instruction pipeline, the method comprising:
    marking instructions fetched into the instruction pipeline to indicate their branch prediction dependencies, wherein at least one of the instructions fetched into the instruction pipeline was selected based on a dynamic branch prediction, wherein the dynamic branch prediction includes predicting branch conditions based on accumulated branch prediction statistics, wherein marking instructions comprises:
        appending a branch flush tag of one or more bits to each conditional branch instruction fetched into the instruction pipeline to be carried with the conditional branch instruction through the instruction pipeline, wherein the branch flush tag identifies an instruction as a conditional branch instruction; and
        appending a corresponding branch path tag to each instruction fetched into the instruction pipeline wherein each branch path tag identifies at least one conditional branch instruction that a particular instruction depends upon;
    detecting an incorrect branch prediction of a particular conditional branch instruction;
    broadcasting a flush signal to at least one stage of the instruction pipeline based on a branch flush tag of the particular conditional branch instruction; and
    in response to receipt of the flush signal, flushing all instructions in the at least one stage of the instruction pipeline whose branch path tags are marked with the branch flush tag of the particular conditional branch instruction.

2. The method of claim 1, wherein marking instructions comprises:
    activating one or more bit indicators responsive to making branch predictions;
    maintaining a particular bit indicator corresponding to a particular branch prediction in an active state until the particular branch prediction is resolved; and
    marking each instruction fetched into the instruction pipeline with an aggregation of the active bit indicators.

3. The method of claim 2, wherein flushing all instructions in the at least one stage of the instruction pipeline whose branch path tags are marked with the branch flush tag of the particular conditional branch instruction further comprises broadcasting the flush signal based on a particular bit indicator corresponding to the incorrect branch prediction, and flushing instructions in the instruction pipeline that are marked with the particular bit indicator.

4. The method of claim 2, further comprising,:
    detecting correct branch predictions, and
    broadcasting a clear signal based on a bit indicator corresponding to a correct branch prediction to clear the corresponding bit indicator from the instructions in the instruction pipeline that were marked as being dependent on the correct branch prediction.

5. The method of claim 1, wherein flushing all instructions in the at least one stage of the instruction pipeline whose branch path tags are marked with the branch flush tag of the particular conditional branch instruction further comprises resolving branch conditions in an execution stage of the instruction pipeline to detect correct and incorrect branch predictions.

6. The method of claim 5, further comprising:
    responsive to detecting a correct branch prediction of a predicted conditional branch instruction, broadcasting a clear signal in the at least one stage of the instruction pipeline based on the branch flush tag of the predicted conditional branch instruction; and
    clearing any indicator from the branch path tags of instructions in the at least one stage of the instruction pipeline that corresponds to the branch flush tag of the predicted conditional branch instruction.

7. The method of claim 6, further comprising reusing branch flush tags for which flush or clear signals have been broadcast to mark new branch prediction dependencies in association with ongoing instruction fetching operations.

8. The method of claim 1, further comprising:
    retiring a branch flush tag assigned to a given conditional branch instruction after resolving a branch condition of an associated conditional branch instruction or after flushing the given conditional branch instruction; and
    reusing retired branch flush tags to mark new branch prediction dependencies.

9. The method of claim 1, further comprising inserting no operation (NOP) instructions into the at least one stage of the instruction pipeline to replace the flushed instructions.

10. The method of claim 1, wherein the branch flush tag is appended as a bit vector to each conditional branch instruction.

11. A processor comprising an instruction pipeline that includes a flush control circuit configured to:
    mark instructions fetched into the instruction pipeline to indicate their branch prediction dependencies, wherein marking instructions comprises:
        appending a branch flush tag as one or more bits that are appended to each conditional branch instruction fetched into the instruction pipeline to be carried with the conditional branch instruction through the instruction pipeline, wherein the branch flush tag identifies an instruction as a conditional branch instruction; and appending a corresponding branch path tag to each instruction fetched into the instruction pipeline;

detect an incorrect branch prediction of a particular conditional branch instruction;

broadcast a flush signal from the flush control circuit to at least one stage of the instruction pipeline based on a branch flush tag of the particular conditional branch instruction; and in response to receipt of the flush signal, flush all instructions in the at least one stage of the instruction pipeline whose branch path tags are marked with the branch flush tag of the particular conditional branch instruction.

12. The processor of claim 11, wherein the flush control circuit is configured to mark instructions by:

activating one or more bit indicators responsive to making branch predictions;

maintaining a particular bit indicator corresponding to a particular branch prediction in an active state until the particular branch prediction is resolved; and marking each instruction fetched into the instruction pipeline with an aggregation of the active bit indicators.

13. The processor of claim 11, wherein the flush control circuit is configured to flush all instructions in the at least one stage of the instruction pipeline whose branch path tags are marked with the branch flush tag of the particular conditional branch instruction by broadcasting the flush signal based on a bit indicator corresponding to the incorrect branch prediction to flush instructions in the at least one stage of the instruction pipeline that are marked with that bit indicator.

14. The processor of claim 11, wherein one or more stages of the instruction pipeline include instruction flushing circuitry configured to receive the flush signal, and further configured to flush instructions in the at least one stage of the instruction pipeline that are marked with one or more bit indicators communicated by the flush signal.

15. The processor of claim 12, wherein the flush control circuit is configured to broadcast a clear signal based on the bit indicator corresponding to a correct branch prediction to clear a corresponding bit indicator from instructions in the at least one stage of the instruction pipeline that were marked as being dependent on the correct branch prediction.

16. The processor of claim 15, wherein one or more stages of the instruction pipeline include instruction flushing circuitry configured to receive the clear signal and further configured to clear markings from instructions in the at least one stage of the instruction pipeline corresponding to one or more bit indicators communicated by the clear signal.

17. The processor of claim 11, wherein the flush control circuit is further configured to, responsive to a correct branch prediction of a predicted conditional branch instruction, broadcast a clear signal in the at least one stage of the instruction pipeline based on the branch flush tag of the predicted conditional branch instruction to clear any indicator from the branch path tags of instructions currently in the at least one stage of the instruction pipeline that corresponds to the branch flush tag of the predicted conditional branch instruction.

18. The processor of claim 17, wherein in response to a broadcast flush signal or clear signal, the flush control circuit is further configured to reuse branch flush tags to mark new branch prediction dependencies in association with ongoing instruction fetching operations.

19. The processor of claim 11, wherein the flush control circuit is further configured to:

retire a particular branch flush tag assigned to a given conditional branch instruction after detecting that a branch condition of the given conditional branch instruction has been resolved or flushed; and reuse the retired branch flush tag to mark a new branch prediction dependency.

20. The processor of claim 11, wherein the instruction pipeline comprises a superscalar instruction pipeline supporting out-of-order program execution, and wherein the flush control circuit supports marking, detection, and flushing among a plurality of parallel execution stages comprising the superscalar pipeline.

21. The processor of claim 11, wherein the branch flush tag is appended as a bit vector to each conditional branch instruction.

22. A method of managing branch predictions in an instruction pipeline, the method comprising:

maintaining active branch flush tags for branch instructions in the instruction pipeline having undetermined branch conditions, wherein each active branch flush tag identifies an instruction as a conditional branch instruction, wherein each conditional branch instruction is marked with an active branch flush tag as one or more bits that are appended to each conditional branch instruction fetched into the instruction pipeline, the one or more bits to be carried with the conditional branch instruction through the instruction pipeline;

marking each instruction fetched into the pipeline with a branch path tag, wherein the branch path tag includes one or more indicators corresponding to the active branch flush tags;

detecting a mispredicted branch instruction by determining an associated branch condition of the mispredicted branch instruction;

broadcasting a flush signal to at least one stage of the instruction pipeline corresponding to the detection of the mispredicted branch instruction; and in response to receipt of the flush signal, flushing all instructions in the at least one stage of the instruction pipeline having branch path tags that include an indicator corresponding to the active branch flush tag of the mispredicted branch instruction.

23. The method of claim 22, wherein the active branch flush tag is appended as a bit vector to each conditional branch instruction.

* * * * *